(12) United States Patent
Kuo

(10) Patent No.: US 7,016,541 B2
(45) Date of Patent: Mar. 21, 2006

(54) IMAGE PROCESSING METHOD FOR FACILITATING DATA TRANSMISSION

(76) Inventor: Shih-Zheng Kuo, 21, Alley 8, Lane 57, Yu-Shi St., Yung-Ho, Taipei (TW)

( * ) Notice: Subject to any disclaimer, the term of this patent is extended or adjusted under 35 U.S.C. 154(b) by 740 days.

(21) Appl. No.: 10/200,225

(22) Filed: Jul. 23, 2002

(65) Prior Publication Data

US 2004/0017948 A1    Jan. 29, 2004

(51) Int. Cl.
    *G06K 9/46* (2006.01)
(52) U.S. Cl. ..................... 382/232; 382/237
(58) Field of Classification Search ........ 382/232–233, 382/237, 166, 254, 240, 275, 271–272; 358/1.15, 358/426.01–426.16; 341/50–51, 67, 84, 341/97; 708/200, 277, 512, 517, 505, 204; 709/247
See application file for complete search history.

(56) References Cited

U.S. PATENT DOCUMENTS

| | | | |
|---|---|---|---|
| 5,365,465 A * | 11/1994 | Larson | 708/204 |
| 5,933,360 A * | 8/1999 | Larson | 708/512 |
| 6,345,285 B1 * | 2/2002 | Nagao et al. | 708/517 |
| 6,721,773 B1 * | 4/2004 | Jennings, III | 708/505 |
| 6,788,224 B1 * | 9/2004 | Leanza | 341/50 |

* cited by examiner

*Primary Examiner*—Joseph Mancuso
*Assistant Examiner*—Ishrat Sherali
(74) *Attorney, Agent, or Firm*—Berkeley Law & Technology Group

(57) ABSTRACT

An image processing method for facilitating data transmission is provided. An image compression method is performed to convert X-bits binary digital signals to a binary compressed data in the form of $n*2^m$, in which n is represented by the former Y bits of the X-bits binary digital signals, m is set to the value of (X–Y), and represented by binary numbers with $[\log_2(X-Y+1)]$ bits. The binary compressed data is transmitted with a sequence of $[\log_2(X-Y+1)]+Y$ bits, representing (m, n), wherein m is the former $[\log_2(X-Y+1)]$ bits and n is the latter Y bits. Therefore, by the present image compression method, the transmission amount of image data is reduced. The transmission time of image data and the volume of a memory for storing the image data are also reduced.

14 Claims, 5 Drawing Sheets

Table 1

| Before compression | After compression | After recovery |
|---|---|---|
| 0000,0000 => | 00 00000 => | 0000,0000 |
| 0000,0001 => | 00 00001 => | 0000,0001 |
| 0000,0010 => | 00 00010 => | 0000,0010 |
| 0000,0011 => | 00 00011 => | 0000,0011 |
| 0000,0100 => | 00 00100 => | 0000,0100 |
| 0000,0101 => | 00 00101 => | 0000,0101 |
| 0000,0110 => | 00 00110 => | 0000,0110 |
| 0001,0000 => | 00 10000 => | 0001,0000 |
| 0010,0000 => | 01 10000 => | 0010,0000 |
| 0010,0001 => | 01 10000 => | 0010,0000 |
| 0010,0010 => | 01 10001 => | 0010,0010 |
| 0010,0011 => | 01 10001 => | 0010,0010 |
| 0010,0100 => | 01 10010 => | 0010,0100 |
| 0010,0101 => | 01 10010 => | 0010,0100 |
| 0100,0000 => | 10 10000 => | 0100,0000 |
| 0100,0001 => | 10 10000 => | 0100,0000 |
| 0100,0010 => | 10 10000 => | 0100,0000 |
| 0100,0011 => | 10 10000 => | 0100,0000 |
| 0100,0100 => | 10 10001 => | 0100,0100 |
| 0100,0101 => | 10 10001 => | 0100,0100 |
| 1111,0000 => | 11 11110 => | 1111,0000 |
| 1111,1000 => | 11 11111 => | 1111,1000 |
| 1111,1100 => | 11 11111 => | 1111,1100 |
| 1111,1101 => | 11 11111 => | 1111,1100 |
| 1111,1110 => | 11 11111 => | 1111,1100 |
| 1111,1111 => | 11 11111 => | 1111,1100 |

FIG. 7

IMAGE PROCESSING METHOD FOR FACILITATING DATA TRANSMISSION

BACKGROUND OF THE INVENTION

1. Field of the Invention

The present invention relates to an image processing method, and more particularly, to an image compression method for binary digital signals.

2. Description of the Prior Art

Without image compression, the transmission of images requires an unacceptable bandwidth in many applications. As a result, methods of compressing images have been the subject of numerous research publications. Image compression schemes convert an image consisting of a two-dimensional array of pixels into a sequence of bits, which are to be transmitted over a communication link. Each pixel represents the intensity of the image at a particular location therein. The transmission link may be an ordinary telephone line.

Consider an image comprising a gray-scale representation of a photograph at a resolution of 1000×1000 lines. Each pixel typically consists of 8 bits, which are used to encode 256 possible intensity levels at the corresponding point on the photograph. Hence, without compression, transmission of the photograph requires that 8 million bits be sent over the communication link. A typical telephone line is capable of transmitting about 9600 bits per second; hence the picture transmission would require more than 10 minutes. Transmission times of this magnitude are unacceptable.

As a result, image compression systems are needed to reduce the transmission time. It will also be apparent to those skilled in the art that image compression systems may also be advantageously employed in image storage systems to reduce the amount of memory needed to store one or more images.

Image compression involves transforming the image to a form, which can be represented in fewer bits without losing the essential features of the original images. The transformed image is then transmitted over the communication link and the inverse transformation is applied at the receiver to recover the image. The compression of an image typically requires two steps. In the first step, the image is transformed to a new representation in which the correlation between adjacent pixels is reduced. This transformation is usually completely reversible, that is, no information is lost at this stage. The number of bits of data needed to represent the transformed image is at least as large as that needed to represent the original image. The purpose of this transformation is to provide an image representation, which is more ideally suited to known compression methods.

In the second step, referred to as quantization, each pixel in the transformed image is replaced by a value, which is represented in fewer bits, on average, than the original pixel value. In general, the original gray scale is replaced by a new scale, which has coarser steps and hence can be represented in fewer bits. The new gray scale is calculated from the statistical distribution of the pixel values in the transformed image.

The quantized image resulting from the above two steps is often further coded for transmission over the communication link. This coding is completely reversible. Its purpose is to provide a more compact representation of the quantized picture. At the other end of the communication link, the coded image is decoded, the quantization transformation is reversed and the inverse of the first transformation is performed on the resulting image to provide a reconstructed image.

However, the known image compression method usually utilizes a complicated encoding and decoding circuitry to attain the more compact image data for transmission. The coding/decoding process is also complicated. Moreover, the image transformation circuitry is a significant cost factor in image compression apparatuses. The required computational expense clearly depends on the image transformation selected. Hence, an image compression method, which requires less computation than the prior image compression method, would be advantageous.

SUMMARY OF THE INVENTION

It is one objective of the present invention to provide an image processing method for facilitating data transmission, which performs an image compression method for converting X-bits binary digital signals to a binary compressed data in the form of $n*2^m$, in which n is represented by the former Y bits of the X-bits binary digital signals, m is set to (X−Y), and represented with $[\log_2(X-Y+1)]$ bits, such that the binary compressed data can be transmitted with a sequence of $[\log_2(X-Y+1)]$ bits, representing (m, n), wherein m is the former $[\log_2(X-Y+1)]$ bits and n is the latter Y bits. Therefore, the transmission amount of image data is reduced, and the transmission rate of the image data is facilitated.

It is another objective of the present invention to provide an image processing method for facilitating data transmission, which implements a simple compression method to convert X-bits binary digital signals to a binary compressed data in the form of $n*2^m$. The complicated encoding and decoding processes for image compression and processing circuits therefore are omitted by the present compression method.

It is a further objective of the present invention to provide an image processing method, which performs a bit-enhanced technology to compensate decompressed image data to increase the accuracy of the recovery of the image data.

In order to achieve the above objectives of this invention, the present invention provides an image processing method for facilitating data transmission. The present method comprises capturing an image signal from an object with an image capture device, and providing the image signal to an analog-to-digital converter for converting the image signal to X-bits binary digital signals, wherein X is a natural number. Then, the X-bits binary digital signals is transmitted to image processing means for compressing the X-bits binary digital signals to a binary compressed data in the form of $n*2^m$, wherein X bits includes bit (X−1) to bit 0, m is a non-negative integer; when n is represented by the former Y bits of the X-bits binary digital signals, Y is a natural number, m is set to (X−Y), and then m is represented by binary numbers with $[\log_2(X-Y+1)]$ bits. Accordingly, the X-bits binary digital signals are converted to the binary compressed data represented by (m, n) with a sequence of $[\log_2(X-Y-1)]+Y$ bits, wherein m is the former $[\log_2(X-Y+1)]$ bits and n is the latter Y bits. The binary compressed data represented by (m, n) with the sequence of $[\log_2(X-Y+1)]+Y$ bits is then transmitted to memory means for storage. By the present image compression method, the transmission amount of image data is reduced. The transmission rate of image data is facilitated and the volume of a memory for storing the image data is also reduced.

BRIEF DESCRIPTION OF THE DRAWINGS

The objectives and features of the present invention as well as advantages thereof will become apparent from the following detailed description, considered in conjunction with the accompanying drawings.

FIG. 7 is a table I listing 8-bits binary image data, and 7-bits binary compressed data and recovered image data thereof.

DESCRIPTION OF THE PREFERRED EMBODIMENTS

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams and flowcharts.

Figure 1:
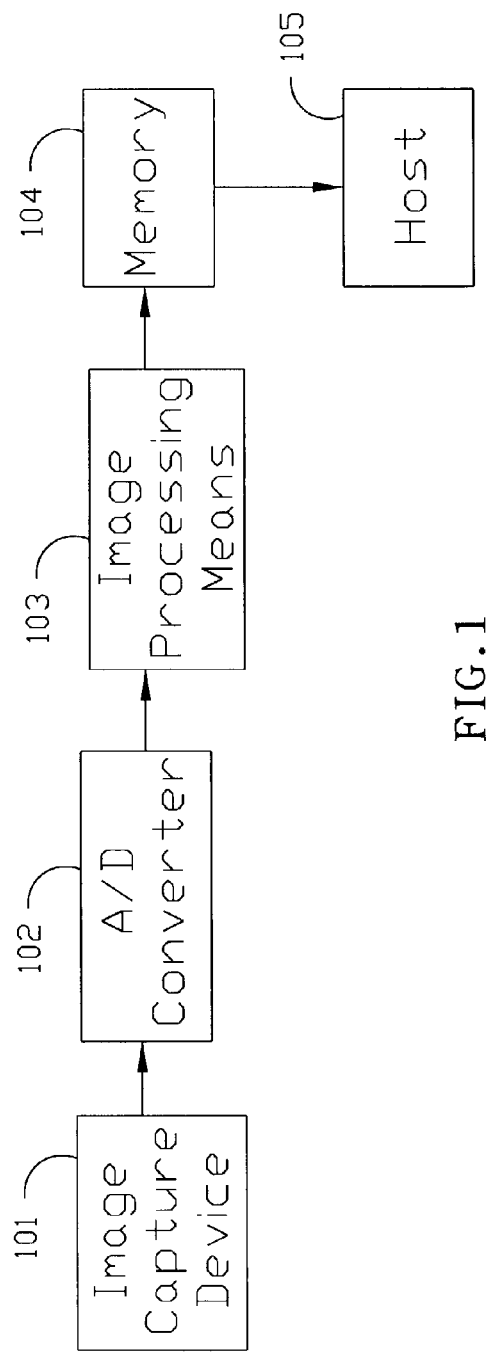
FIG. 1 is a block diagram of an image processing system implementing image compression methods of the present invention.
Figure 2:
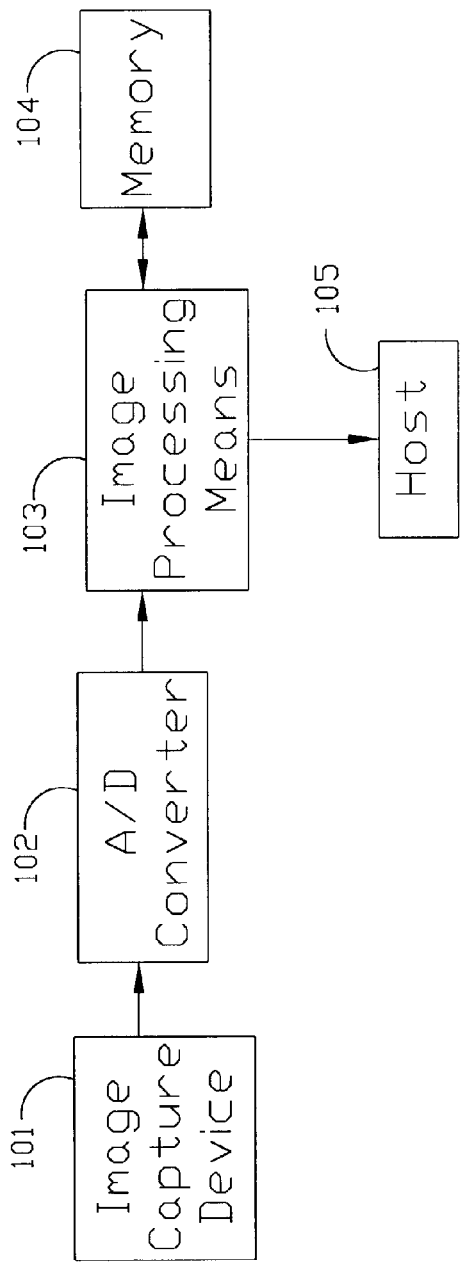
FIG. 2 is a block diagram of another image processing system implementing the image compression methods of the present invention.
Figure 3:
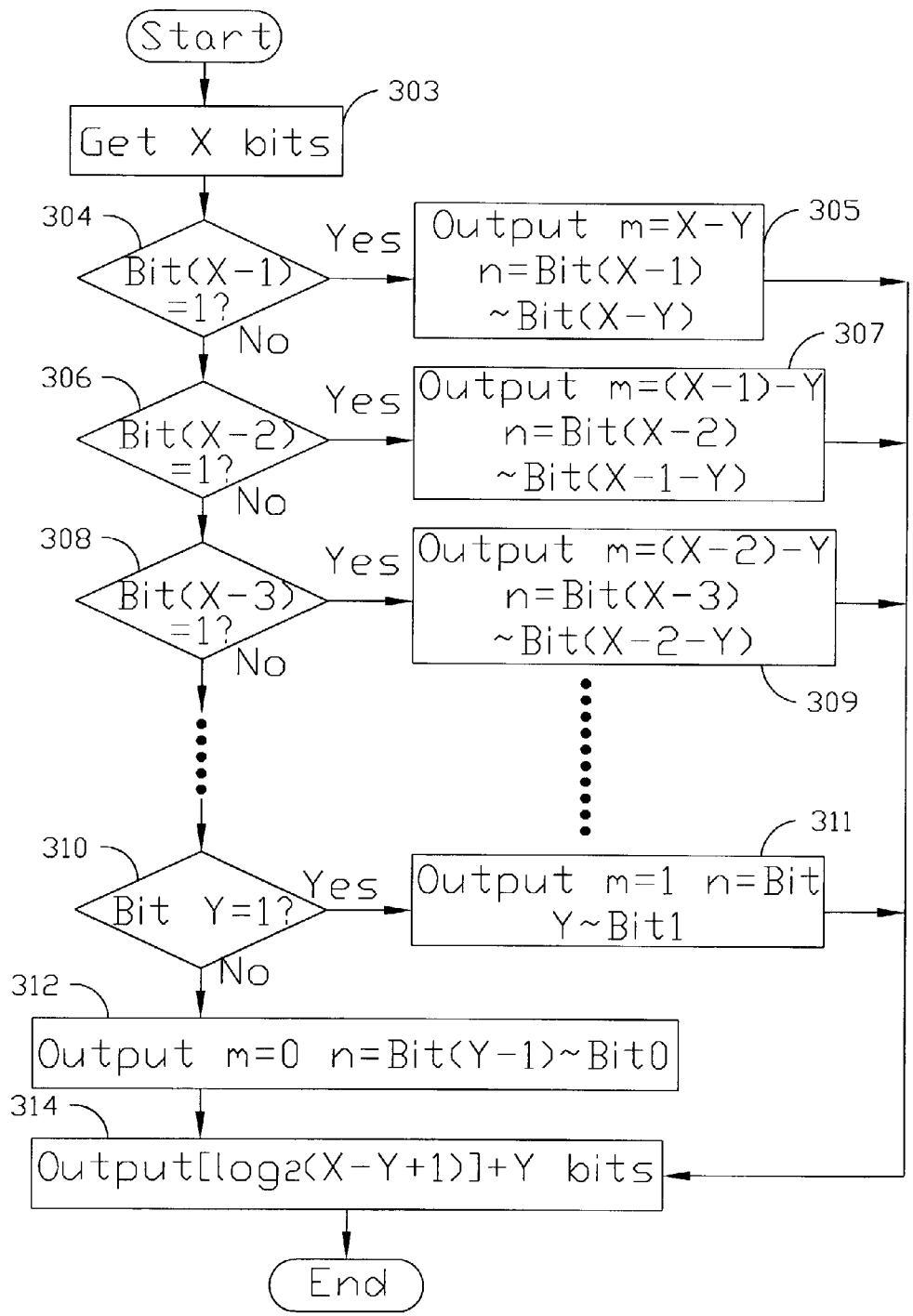
FIG. 3 is a flow chart of a first embodiment of the present invention illustrating the present image compression method.
Figure 4:
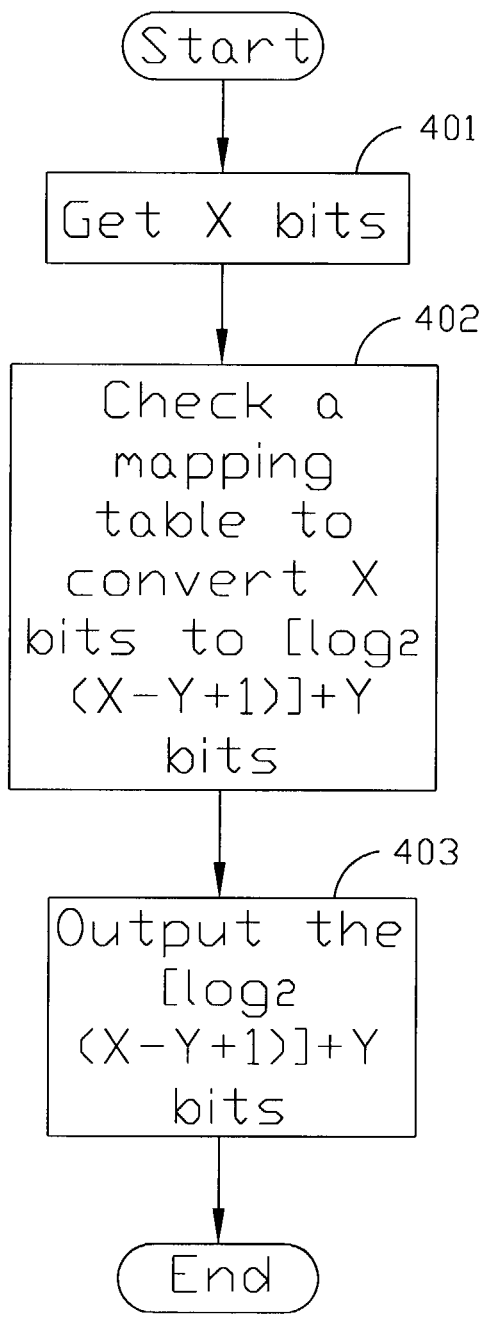
FIG. 4 is a flow chart of a second embodiment of the present invention illustrating the present image compression method.
Figure 5:
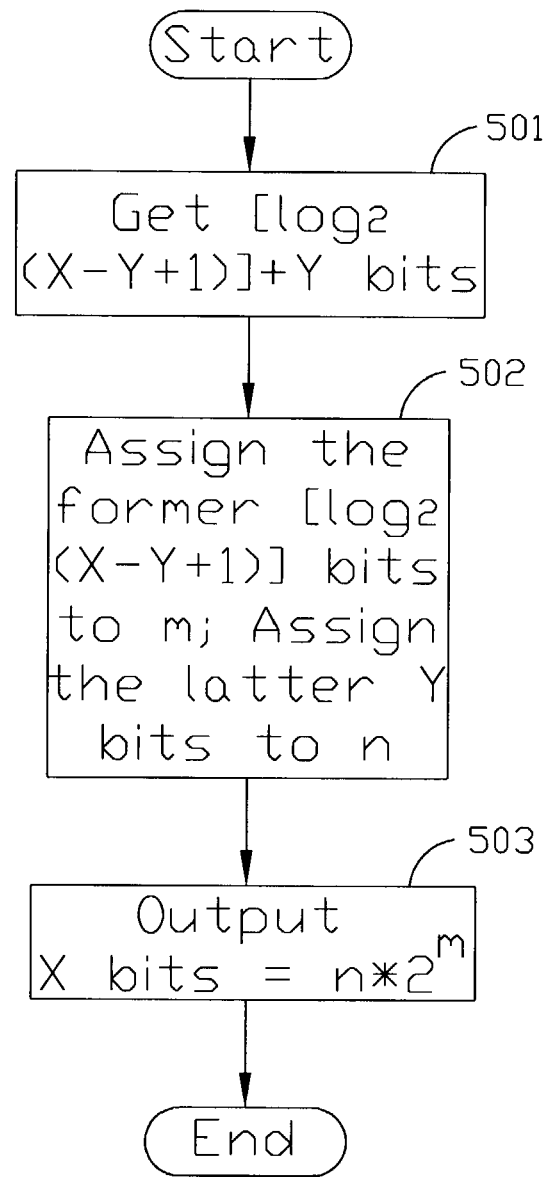
FIG. 5 is a flow chart for illustrating an image decompression process of the present invention.
Figure 6:
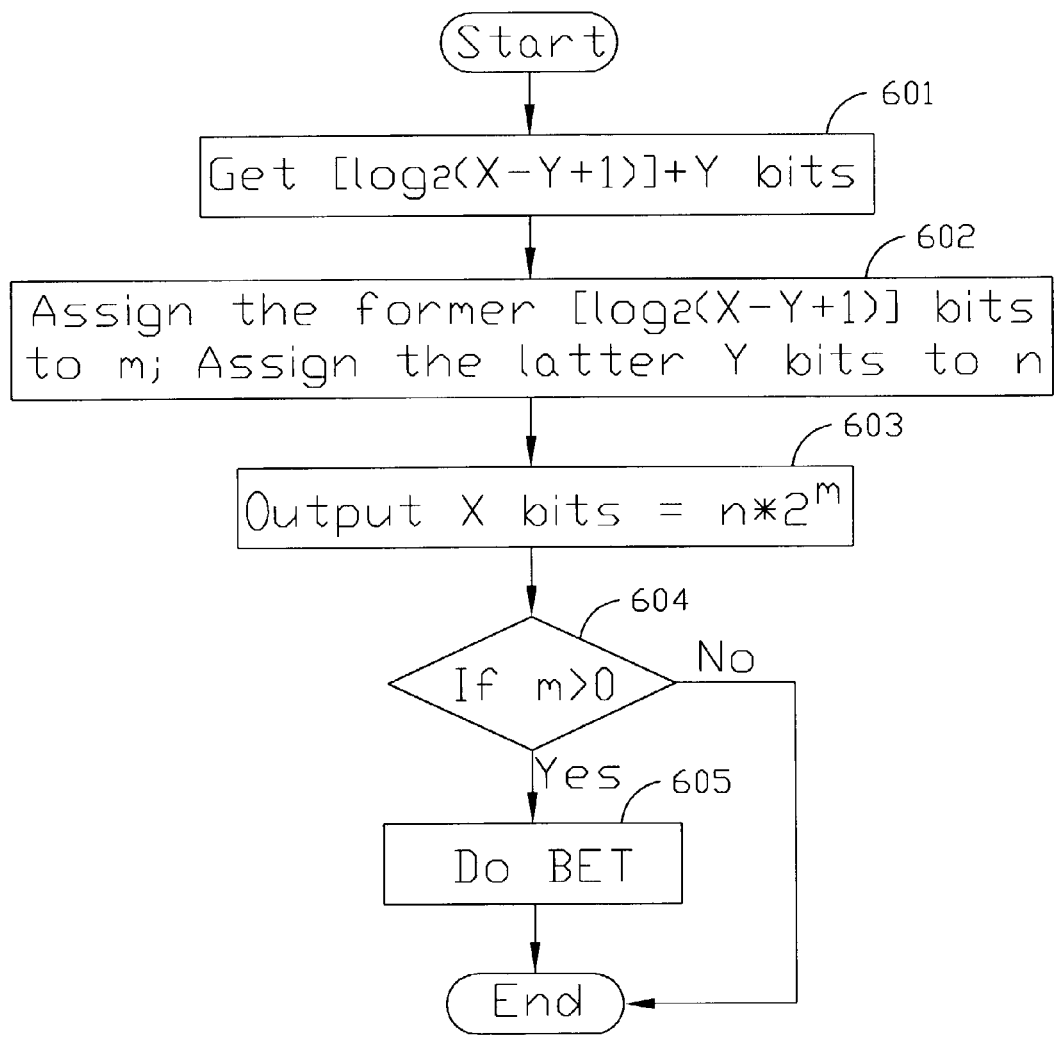
FIG. 6 is a flow chart for illustrating another image decompression process of the present invention.

FIG. 1 is a block diagram of an image processing system implementing image compression methods of the present invention, and FIG. 2 is a block diagram of another image processing system implementing the image compression methods of the present invention. FIG. 3 is a flow chart of a first embodiment of the present invention illustrating the present image compression method. FIG. 4 is a flow chart of a second embodiment of the present invention illustrating the present image compression method. FIG. 5 is a flow chart for illustrating an image decompression process of the present invention, and FIG. 6 is a flow chart for illustrating another image decompression process of the present invention. FIG. 7 is a table I listing 8-bits binary image data, and 7-bits binary compressed data and recovered image data thereof.

Initially, referring to FIG. 1, an image is captured from an object by an image capture device 101, e.g. charge-coupled device (CCD), CMOS sensor and the like capable of converting an image signal to an electric signal. The image signal represents intensity of a pixel of the image captured by the image capture device 101. The electric signal is then provided to an A/D converter (analog-to-digital converter) 102 to convert to X-bits binary digital signals, which are consisted of binary values from bit (X−1) to bit 0. The X-bits binary digital signals are transmitted to image processing means 103, e.g. an image processing circuit, for being compressed to a binary compressed data in the form of $n*2^m$. N is represented by the former Y bits of the X-bits binary digital signals, Y is a natural number, and m is set to (X−Y) and represented by binary numbers with $[\log_2(X-Y+1)]$ bits. Hence, by image processing means 103, the X-bits binary digital signals are converted to the binary compressed data represented by (m, n) with a sequence of $[\log_2(X-Y+1)]+Y$ bits, wherein m is the former $[\log_2(X-Y+1)]$ bits and n is the latter Y bits. The binary compressed data is then transmitted with a set of binary values consisted of the sequence of $[\log_2(X-Y+1)]+Y$ bits, (x x . . . , x), to a memory 104, e.g. a buffer memory, for storage.

FIG. 3 is a flow chart of a first embodiment of the present invention illustrating the image compression process implemented by image processing means 103. The image compression process of the first embodiment will be described in detail in the following. In step 303, the X-bits binary digital signals consisted of binary values from bit (X−1) to bit 0 is provided to image processing means 103. The X-bits binary digital signals are converted to the binary compressed data in the form of $n*2^m$, wherein n is represented by the former Y bits of the X-bits binary digital signals. Following, in step 304, when bit (X−1) is logic level "1", n is represented by the former bit (X−1) to bit (X−Y) of the X-bits binary digital signals, m is set to (X−Y) and represented by binary numbers with $[\log_2(X-Y+1)]$ bits, as step 305. The binary compressed data is then outputted by (m, n) with the sequence of $[\log_2(X-Y+1)]+Y$ bits, as step 314, wherein m is represented by the former $[\log_2(X-Y+1)]$ bits and n is the latter bits consisted of bit (X−1) to bit (X−Y). In step 306, when bit (X−1) is logic level "0" and bit (X−2) is logic level "1", n is represented by the former bit (X−2) to bit (X−1−Y) of the X-bits binary digital signals, m is set to (X−1−Y) and is represented by binary numbers with $[\log_2(X-Y+1)]$ bits, as step 307. The binary compressed data is then outputted by (m, n) with $[\log_2(X-Y+1)]+Y$ bits, as step 314, wherein m is represented by the former $[\log_2(X-Y+1)]$ bits and n is the latter bits consisted of bit (X−2) to bit (X−1−Y). In step 308, when bit (X−1) and bit (X−2) are logic level "0", and bit (X−3) is logic level "1", n is represented by the former bit (X−3) to bit (X−2−Y) of the X-bits binary digital signals, m is set to (X−2−Y) and is represented by binary numbers with $[\log_2(X-Y+1)]$ bits, as step 309. The binary compressed data is then outputted by (m, n) with $[\log_2(X-Y+1)]+Y$ bits, wherein m is represented by the former $[\log_2(X-Y+1)]$ bits and n is the latter bits consisted of bit (X−3) to bit (X−2−Y), as step 314.

Several similar data processing steps are performed until step 310, when each of bit (X−1) to bit (Y+1) is logic level "0" and bit Y is logic level "1", n is represented by bit Y to bit 1, m is set to 1 and is represented by binary digital numbers with $[\log_2(X-Y+1)]$ bits, as step 311. The binary compressed data is then outputted by (m, n) with $[\log_2(X-Y+1)]+Y$ bits, wherein m is represented by the former $[\log_2(X-Y+1)]$ bits and n is the latter bits consisted of bit Y to bit 1, as step 314. In step 312, when each of bit (X−1) to bit Y is logic level "0" and bit (Y−1) is logic level "1", n is represented by bit (Y−1) to bit 0, m is set to 0 and is represented by binary numbers with $[\log_2(X-Y+1)]$ bits, (00). The binary compressed data is then outputted by (m, n) with $[\log_2(X-Y+1)]+Y$ bits, wherein m is represented by the former $[\log_2(X-Y+1)]$ bits and n is the latter bits consisted of bit Y−1 to bit 0, as step 314.

FIG. 7 is a table I, listing 8-bits binary digital signals consisted of bit 7 to bit 0, and 7-bits binary compressed data and the recovered image data thereof. The 7-bits binary compressed data in table I are generated from the compression method according to the first embodiment, illustrated in FIG. 3, in which n is represented by the former 5 bits of the 8-bits binary digital signals, i.e. bit 7 to bit 3, and m is set to a value of 8−5=3, represented by $[\log_2(8-5+1)]$ bits, i.e. two bits. The 7-bits binary compressed data is represented by seven binary values "x x x x x x x". The former two binary values "x x" represent the value of m, and the latter five binary values "x x x x x" represent n. However, the present compression method is also suited to compress binary digital signals consisted of 10-bits, 12-bits and 16-bits, etc. And, n is determined according to quality of the image desired.

Referring to FIG. 1 again, the binary compressed data stored in the memory 104 is then outputted to a host 105 for further processing, such as decompressing to recover the original image data and print out. One decompression method of the present invention implemented in the host 105 is illustrated in FIG. 5. In step 501, the binary compressed data in the form of $n*2^m$ represented by (m, n) with $[\log_2(X-Y+1)]+Y$ bits are outputted to the host 105 from the memory 104. In step 502, the former $[\log_2(X-Y+1)]$ bits of the binary compressed data are assigned to m, thereby obtaining the value of m, and the latter Y bits of the binary compressed data are assigned to n. In step 503, based on the compression algorithm $n*2^m$, binary values of n and the value of m, the binary compressed data is decompressed to recover to the X-bits binary digital signals.

As shown in table I of FIG. 7, the higher the grayscale level of the pixel is, the higher the distortion of the recovered image data is. Thus, another decompression method of the present invention utilizing a bit-enhanced technology (BET) is provided to compensate loss of the recovered image data, which is illustrated in FIG. 6, in which, step 601 to step 603 are the same with step 501 to step 503 of FIG. 5. When m is a positive integer, as step 604, a bit-enhanced method is applied to the recovered image data. In step 605, the bit-enhanced method comprises steps of (a) calculating a first average of a plurality of neighboring pixels around the pixel to be compensated; and (b) calculating a second average of the first average and the pixel. As a result, the compensated data of the pixel is obtained.

In accordance with the compressed method of FIG. 3, 8-bits binary digital signals are compressed to 7-bits binary compressed data, 10-bits binary digital signals are compressed to 9-bits binary compressed data, 12-bits binary digital signals are compressed to 11 bits binary compressed data, and 16-bits binary digital signals are compressed to 15-bits binary compressed data. Hence, transmission amount of the image data transmitted to the memory 104 and the host 105 is reduced. The transmission time of the image data is thus decreased, and the volume of the memory 104 for storing the image data is also reduced.

FIG. 4 is a flow chart of another image compression method according to a second embodiment of the present invention. In step 401, the X-bits binary digital signals consisted of binary values from bit (X−1) to bit 0 is provided to image processing means 103. In step 402, based on a mapping table, the X-bits binary digital signals are mapped to a binary compressed data represented by (m, n) with $[[\log_2(X-Y+1)]+Y]$-bits binary numbers, in which m is represented by the former $[\log_2(X-Y+1)]$ bits and n is represented by the latter Y bits. The mapping table is generated according to the compression algorithm $n*2^m$, wherein n is represented by the former Y bits of the X-bits binary digital signals, m is set to (X−Y) and represented by binary numbers with $[\log_2(X-Y+1)]$ bits. In step 403, the binary compressed data is then transmitted to the memory 104 for storage.

FIG. 2 is a block diagram of another image processing system implementing the present image compression method, in which the binary compressed data stored in the memory 104 is accessed by image processing means 103, and then outputted to the host 105 for further processing, such as decompressing to recover the original image data. Since the data communication between image processing means 103, the memory 104 and the host 105 is in the form of the binary compressed data, the transmission amount of the image data between them is reduced, and the transmission time of the image data is therefore reduced.

With reference to the list of table I of FIG. 7 again, the recovered image data of a pixel with a low grayscale level is less distorted, and the recovered image data of a pixel with a higher grayscale level is more distorted. Therefore, a purpose for making the recovered image of a black-area image, i.e. image with low grayscale levels, non-distorted, and the recovered image of a white-area image, i.e. image with high grayscale levels, noise-eliminated, is obtained in accordance with the present image compression method of FIG. 3.

The embodiments are only used to illustrate the present invention, not intended to limit the scope thereof. Many modifications of the embodiments can be made without departing from the spirit of the present invention.

What is claimed is:

1. An image processing method for facilitating data transmission, comprising:
   capturing an image signal from an object with an image capture device;
   providing said image signal to an analog-to-digital converter for converting said image signal to X-bits binary digital signals, wherein X is a natural number;
   transmitting said X-bits binary digital signals to image processing means for compressing said X-bits binary digital signals to a binary compressed data in the form of $n*2^m$, wherein X bits includes bit (X−1) to bit 0, m is a non-negative integer; when n is represented by the former Y bits of said X-bits binary digital signals, Y is a natural number, m is set to (X−Y), and then m is represented by binary numbers with $[\log_2(X-Y+1)]$ bits, such that said X-bits binary digital signals are converted to said binary compressed data represented by (m, n) with a sequence of $[\log_2(X-Y+1)]+Y$ bits, wherein m is the former $[\log_2(X-Y+1)]$ bits and n is the latter Y bits; and
   storing said binary compressed data represented by (m, n) with the sequence of $[\log_2(X-Y+1)]+Y$ bits in memory means.

2. The method of claim 1, wherein the step of compressing said X-bits binary digital signals to said binary compressed data in the form of $n*2^m$, further comprising:
   (a) when bit (X−1) is logic level "1", n is represented by the former bit (X−1) to bit (X−Y) of said X-bits binary digital signals, m is set to (X−Y), and is represented by binary numbers with $[\log_2(X-Y+1)]$ bits, said binary compressed data is then outputted by (m, n) with the sequence of $[\log_2(X-Y+1)]+Y$ bits, wherein m is represented by the former $[\log_2(X-Y+1)]$ bits and n is the latter bits consisted of said bit (X−1) to said bit (X−Y);
   (b) when bit (X−1) is logic level "0" and bit (X−2) is logic level "1", n is represented by the former bit (X−2) to bit (X−1−Y) of said X-bits binary digital signals, m is set to (X−1−Y) and is represented by binary numbers with $[\log_2(X-Y+1)]$ bits, said binary compressed data is then outputted by (m, n) with $[\log_2(X-Y+1)]+Y$ bits, wherein m is represented by the former $[\log_2(X-Y+1)]$ bits and n is the latter bits consisted of said bit (X−2) to said bit (X−1−Y);
   (c) when bit (X−1) and bit (X−2) are logic level "0", and bit (X−3) is logic level "1", n is represented by the former bit (X−3) to bit (X−2−Y) of said X-bits binary digital signals, m is set to (X−2−Y) and is represented by binary numbers with [log$_2$(X−Y+1)] bits, said binary compressed data is then outputted by (m, n) with [log$_2$(X−Y+1)]+Y bits, wherein m is represented by the former [log$_2$(X−Y+1)] bits and n is the latter bits consisted of said bit (X−3) to said bit (X−2−Y);

(d) when each of bit (X−1) to bit (Y+1) is logic level "0" and bit Y is logic level "1", n is represented by bit Y to bit 1, m is set to 1 and is represented by binary numbers with [log$_2$(X−Y+1)] bits, said binary compressed data is then outputted by (m, n) with [log$_2$(X−Y+1)]+Y bits, wherein m is represented by the former [log$_2$(X−Y+1)] bits and n is the latter bits consisted of said bit Y to said bit 1; and (e) when each of bit (X−1) to bit Y is logic level "0" and bit (Y−1) is logic level "1", n is represented by bit (Y−1) to bit 0, m is set to 0 and is represented by binary numbers with [log$_2$(X−Y+1)] bits, said binary compressed data is then outputted by (m, n) with [log$_2$(X−Y+1)]+Y bits, wherein m is represented by the former [log$_2$(X−Y+1)] bits and n is the latter bits consisted of said bit Y−1 to said bit 0.

3. The method of claim 1, further comprising accessing said binary compressed data from said memory means via said image processing means to a host and decompressing said binary compressed data to recover to said X-bits binary digital signals.

4. The method of claim 2, further comprising accessing said binary compressed data from said memory means via said image processing means to a host and decompressing said binary compressed data to recover to said X-bits binary digital signals.

5. The method of claim 3, wherein the step for decompressing said binary compressed data comprises:

(a) assigning the former [log$_2$(X−Y+1)] bits of said binary compressed data to m, thereby obtaining the value of m, and assigning the latter Y bits of said binary compressed data to n; and (b) recovering said binary compressed data in the form of n*2$^m$ to said X-bits binary digital signals.

6. The method of claim 4, wherein the step for decompressing said binary compressed data comprises:

(b) assigning the former [log$_2$(X−Y+1)] bits of said binary compressed data to m, thereby obtaining the value of m, and assigning the latter Y bits of said binary compressed data to n; and (b) recovering said binary compressed data in the form of n*2$^m$ to said X-bits binary digital signals.

7. The method of claim 5, wherein when m is a positive integer, further comprising a step for compensating the pixel corresponding to said X-bits binary digital signals with a bit-enhanced method after the step (b), wherein said bit-enhanced method comprises (c) calculating a first average of a plurality of neighboring pixels around the pixel; and (d) calculating a second average of the first average and the pixel.

8. The method of claim 6, wherein when m is a positive integer, further comprising a step for compensating the pixel corresponding to said X-bits binary digital signals with a bit-enhanced method after the step (b), wherein said bit-enhanced method comprises (c) calculating a first average of a plurality of neighboring pixels around the pixel; and (d) calculating a second average of the first average and the pixel.

9. The method of claim 1, further comprising accessing said binary compressed data from said memory means by a host and decompressing said binary compressed data to recover to said X-bits binary digital signals.

10. The method of claim 2, further comprising accessing said binary compressed data from said memory means by a host and decompressing said binary compressed data to recover to said X-bits binary digital signals.

11. The method of claim 9, wherein the step for decompressing said binary compressed data comprises:

(a) assigning the former [log$_2$(X−Y+1)] bits of said binary compressed data to m, thereby obtaining the value of m, and assigning the latter Y bits of said binary compressed data to n; and (b) recovering said binary compressed data in the form of n*2$^m$ to said X-bits binary digital signals.

12. The method of claim 10, wherein the step for decompressing said binary compressed data comprises:

(a) assigning the former [log$_2$(X−Y+1)] bits of said binary compressed data to m, thereby obtaining the value of m, and assigning the latter Y bits of said binary compressed data to n; and (b) recovering said binary compressed data in the form of n*2$^m$ to said X-bits binary digital signals.

13. The method of claim 11, wherein when m is a positive integer, further comprising a step for compensating the pixel corresponding to said X-bits binary digital signals with a bit-enhanced method after the step (b), wherein said bit-enhanced method comprises (c) calculating a first average of a plurality of neighboring pixels around the pixel; and (d) calculating a second average of the first average and the pixel.

14. The method of claim 12, wherein when m is a positive integer, further comprising a step for compensating the pixel corresponding to said X-bits binary digital signals with a bit-enhanced method after the step (b), wherein said bit-enhanced method comprises (c) calculating a first average of a plurality of neighboring pixels around the pixel; and (d) calculating a second average of the first average and the pixel.

\* \* \* \* \*